(12) United States Patent
Niakan et al.

(10) Patent No.: US 10,947,935 B2
(45) Date of Patent: *Mar. 16, 2021

(54) INTERFACE AIR FILTER AND ASSEMBLY

(71) Applicant: Advanced FLOW Engineering Inc., Corona, CA (US)

(72) Inventors: Shahriar Nick Niakan, Anaheim Hills, CA (US); Saul Daniel Zambrano, Corona, CA (US); Stuart T. Miyagishima, Corona, CA (US)

(73) Assignee: Advanced Flow Engineering, Inc., Corona, CA (US)

(*) Notice: Subject to any disclaimer, the term of this patent is extended or adjusted under 35 U.S.C. 154(b) by 572 days.

This patent is subject to a terminal disclaimer.

(21) Appl. No.: 15/732,145

(22) Filed: Sep. 25, 2017

(65) Prior Publication Data
US 2018/0245549 A1 Aug. 30, 2018
US 2020/0224615 A9 Jul. 16, 2020

Related U.S. Application Data

(63) Continuation of application No. 15/530,774, filed on Feb. 27, 2017, now Pat. No. 9,957,927, which is a continuation of application No. 13/986,263, filed on Apr. 16, 2013, now Pat. No. 9,816,468.

(51) Int. Cl.
*F02M 35/024* (2006.01)
*B01D 46/00* (2006.01)

(52) U.S. Cl.
CPC ... *F02M 35/02416* (2013.01); *B01D 46/0005* (2013.01); *B01D 2275/201* (2013.01); *B01D 2279/60* (2013.01)

(58) Field of Classification Search
None
See application file for complete search history.

(56) References Cited

U.S. PATENT DOCUMENTS

| 4,065,276 A | 12/1977 | Nakaya et al. |
| 4,244,718 A | 1/1981 | Noddin |
| 4,541,658 A | 9/1985 | Bartholomew |
| 4,902,043 A | 2/1990 | Zillig et al. |
| 5,195,787 A | 3/1993 | Bartholomew |
| 5,752,726 A | 5/1998 | Fixemer |
| 5,868,808 A | 2/1999 | Henderson |

(Continued)

*Primary Examiner* — Christopher P Jones
*Assistant Examiner* — Phillip Y Shao
(74) *Attorney, Agent, or Firm* — Ravi Mohan; Rutan & Tucker, LLP

(57) ABSTRACT

An air filter retention interface for use with an internal combustion engine is disclosed. The interface is substantially secured in an opening of a wall and the interface attaches to an air filter at the front end of the interface and an air intake tube on the back end of the interface. The interface has a filter sleeve and a filter base. During operation of the engine the filter sleeve is disposed through the opening in the wall such that the wall is between beads disposed on the external surface of the filter sleeve and the filter base thereby substantially securing the interface in place and the front end of the filter base is attached to the filter and the back end of the filter base is attached to the air intake tube and air passes through the filter then through the filter base and filter sleeve and then into the air intake tube and toward the engine.

1 Claim, 3 Drawing Sheets

(56) References Cited

U.S. PATENT DOCUMENTS

| | | |
|---|---|---|
| 5,888,260 A | 3/1999 | Sica |
| 5,954,345 A | 9/1999 | Svoboda et al. |
| 5,971,445 A | 10/1999 | Norkey |
| 6,029,981 A | 2/2000 | Hawley et al. |
| 6,053,875 A * | 4/2000 | Rosenbaum ............. A61B 5/12 374/158 |
| 6,383,244 B1 | 5/2002 | Wake et al. |
| 6,739,597 B2 | 5/2004 | Nicolia et al. |
| 6,817,631 B1 | 11/2004 | Gavin |
| 6,866,304 B2 | 3/2005 | Kaminski et al. |
| 7,299,688 B2 | 11/2007 | Salvisberg |
| 7,306,235 B2 | 12/2007 | Roberts et al. |
| 7,497,478 B2 | 3/2009 | Callahan |
| 7,878,299 B2 | 2/2011 | Geyer, III |
| 8,101,003 B2 | 1/2012 | Krisko et al. |
| 2009/0107340 A1 | 4/2009 | Niakan et al. |
| 2009/0165447 A1 | 7/2009 | Hiranuma et al. |
| 2010/0224161 A1 | 9/2010 | Kolczyk et al. |
| 2012/0304400 A1 | 12/2012 | Jenkins et al. |

\* cited by examiner

INTERFACE AIR FILTER AND ASSEMBLY

The present application is a continuation of U.S. application Ser. No. 15/530,774, filed Feb. 27, 2017, and U.S. application Ser. No. 15/530,774 is a continuation of U.S. application Ser. No. 13/986,263, filed Apr. 16, 2013 the entire contents of both applications are herewith incorporated by reference. The present application claims priority to and/or the benefit of the applications identified above.

FIELD OF THE INVENTION

This invention generally relates to air filters for use with internal combustion engines.

BACKGROUND OF THE INVENTION

Air filters are critical components for internal combustion engines. The filter performs the function of removing debris from the air as the air is transferred into the engine. This reduces contamination that would otherwise enter the engine. In turn, the cleaner air allows the engine to run more efficiently and reduces wear that can occur with the introduction of particulate matter in the combustion process.

There are a variety of techniques used to secure the filter in proximity to the engine. However, the existing techniques tend to be difficult to use when installing or replacing the filter. What is needed is a more efficient technique for installing or replacing the filter.

SUMMARY OF THE INVENTION

In accordance with the present disclosure, an air filter retention interface for use with an internal combustion engine is provided. In one embodiment, the interface is substantially secured in an opening of a wall and the interface attaches to an air filter at the front end of the interface and an air intake tube on the back end of the interface.

The interface has a filter sleeve having an internal surface, an external surface, an outer radius, and a front and back ends.

The external surface of the filter sleeve has beads extending above the external surface and disposed substantially along a circumferential line extending around the external surface.

There is an filter base having an outer radius greater than the outer radius of the filter sleeve and the filter base having an opening and the filter base is attached to the front end of the filter sleeve;

During operation of the engine the filter sleeve is disposed through the opening in the wall such that the wall is between the beads and the filter base and the interface is substantially secured in place and the filter base is attached to the filter and the back end of the filter sleeve is attached to the air intake tube and air passes through the filter then through the filter sleeve and then into the air intake tube and toward the engine.

BRIEF DESCRIPTION OF THE DRAWINGS

The invention is generally shown by way of reference to the accompanying drawings in which.

DETAILED DESCRIPTION OF THE INVENTION

Figure 1:
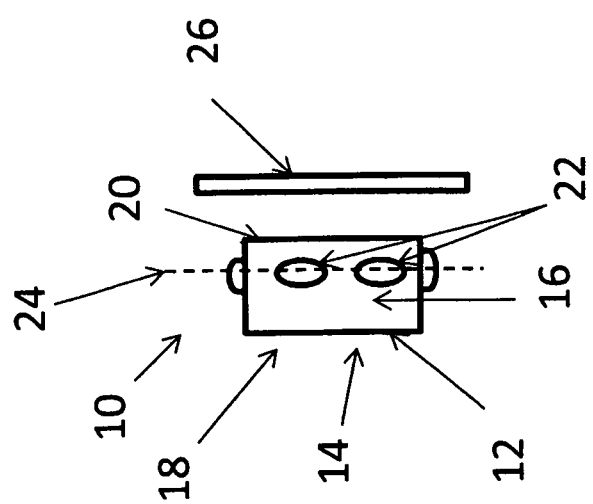
FIG. 1 is a side view of the elements of one embodiment of an air filter retention interface.

FIG. 1 shows an embodiment of the air filter retention interface 10. There is a filter sleeve 12 having an internal surface 14 and an external surface 16. The filter sleeve also has a back end 18 and a front end 20. The filter sleeve is basically a tube that can be fitted over another tube to some degree such as an engine air intake tube. In one embodiment, the filter sleeve is somewhat flexible. Other embodiments can include a more rigid structure. On the external surface 16 there are beads 22 that roughly are along a line 24 and the beads are thus substantially along a circumferential line around the external surface of the filter sleeve. There is also a filter base 26. In this embodiment, the filter base is not attached to the filter.

Figure 2:
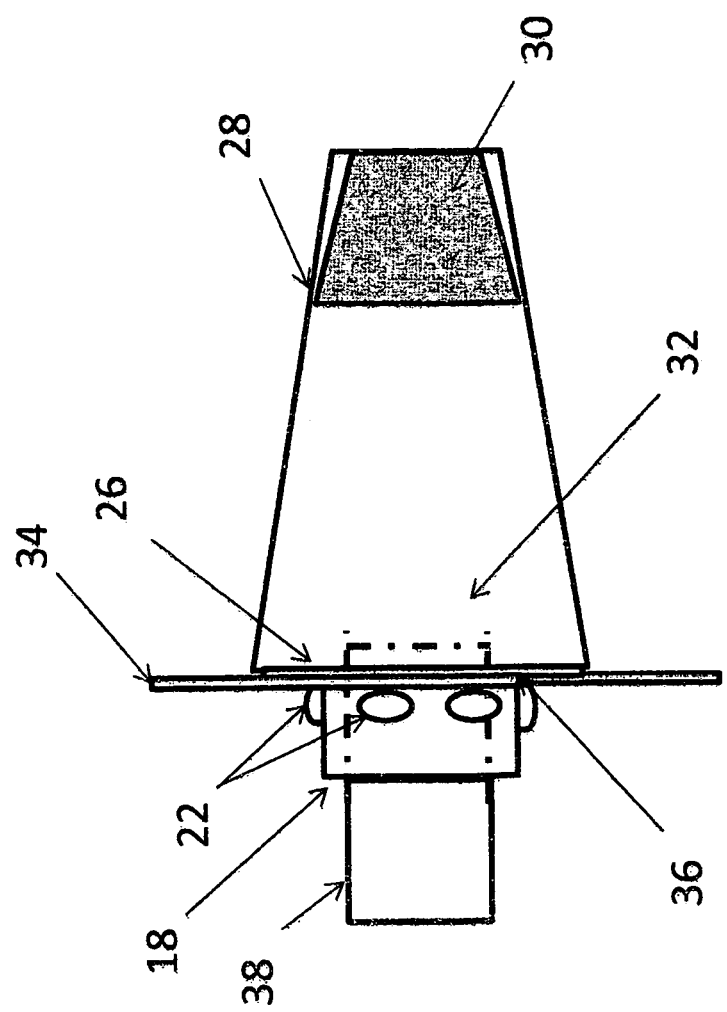
FIG. 2 is a side view of one embodiment of the air filter retention interface, filter, wall, and air inlet tube.

Turning to FIG. 2, the filter base 26 attaches to the front end of the sleeve. The base 26 also attaches to the filter 28. The filter base 26 has a passage that allows air to flow between the filter 28 and the filter sleeve 12. The filter 28 has input ports 30 where air enters and is filtered. There is also an output port 32 inside the filter where the filtered air can be directed away from the filter 28.

In one embodiment, the beads 22 are made of a relatively flexible material such as rubber. In use, the filter sleeve 12 is attached to the base 26. The sleeve is placed through an opening 36 in the wall 34. The wall 34 may be a part of a filter housing chamber or another structure possibly within an engine compartment that can provide support for the interface. The opening 36 is large enough to allow the filter sleeve 12 to pass and would normally not allow the beads 22 to pass is the beads 22 and base 26 were rigid. Since the beads 22 are somewhat flexible, the beads 22 and filter sleeve 12 structure can pass through the opening 36. The wall then abuts the filter base 26 on one side and the beads 22 on the other. This relatively secures the interface 10 in place. It should be appreciated that the geometry and number of the beads 22 can be chosen to fit any particular application desired and is not limited to those in the figures. In another embodiment, the filter sleeve 12 can also be somewhat flexible. The number and geometry of the beads 22 can vary. The beads 22 have a surface that contact the wall of the filter housing chamber. In other embodiments the beads 22 may no be a relatively flexible material and may be substantially rigid.

FIG. 2 also identifies an air inlet tube 38. The air inlet tube 38 passes through the back end 18 of the filter sleeve 12. The tube 38 can extend through the sleeve 12 and filter base 26 into the filter 28. However, the depth of penetration of the tube 38 can be a function of any particular application. Also, while it may appear that the attachment end of the filter may be generally circular in shape, filters of other attachment end geometries and structural geometries are used in other embodiments.

Figure 3:
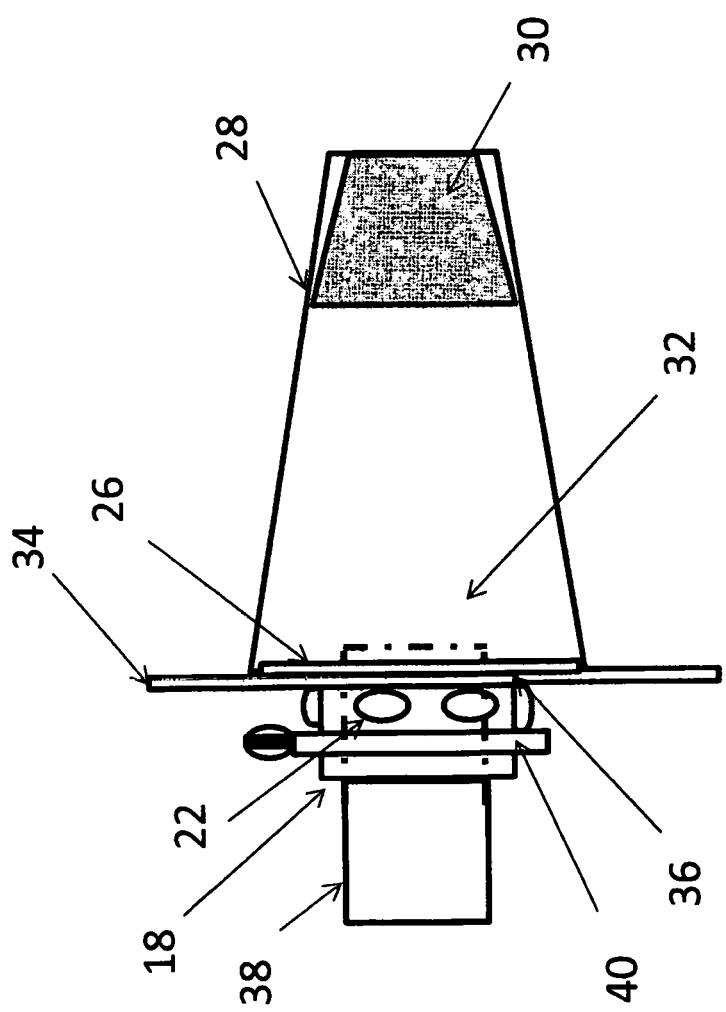
FIG. 3 is a side view of one embodiment of the air filter retention interface, filter, wall, air inlet tube, and clamp.

Turning to FIG. 3, a clamp 40 as well known in the art is identified. The clamp 40 extends circumferentially around the filter sleeve 12. The air intake tube 38 extends far enough into the sleeve 12 so that the clamp 40 can force the filter sleeve 12 against the tube 38 thereby substantially securing the tube 38 in place. The clamp 40 forces the internal surface 14 of the filter sleeve 12 against the tube 38.

As FIG. 3 also indicates, the filter sleeve 12, filter base 26 and filter 28 can be combined to form a single structure. The sleeve 12 and beads 22 can still be passed through the opening 36 in the wall 34. In other embodiments, the filter base 26 could be detachably connected to a filter by a number of conventional methods including a threading structure. It should also be appreciated that the base 26 could be of a number of geometries to fit the geometries of a desired filter or that an interface could be used to couple a filter base 26 of one geometry to a filter 28 of another geometry.

While embodiments have been described in detail, it should be appreciated that various modifications and/or variations may be made without departing from the scope or spirit of the invention. In this regard it is important to note that practicing the invention is not limited to the applications described herein. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein. Thus, it is intended that the invention cover all such embodiments and variations. Nothing in this disclosure is intended to limit the scope of the invention in any way.

What is claimed is:

1. An air filter retention interface for use with an air filter housing chamber wall, the air filter retention interface comprising:
   a filter sleeve having an external surface and an internal surface;
   a clamp extending circumferentially around the filter sleeve;
   the external surface of the filter sleeve having a plurality of flexible beads extending outwardly from the external surface and disposed substantially along a circumferential line extending around the external surface and each bead having a surface to contact an air filter housing chamber wall; and
   a detachable filter base adapted to abut the air filter housing chamber wall when the filter sleeve is disposed through an opening in the air filter housing chamber wall;
wherein, the air filter housing chamber wall substantially contacts the bead surfaces, and the air filter housing chamber wall substantially contacts the filter base when the filter sleeve is disposed through an opening in the air filter housing chamber wall.

* * * * *